United States Patent [19]

Nakano et al.

[11] Patent Number: 4,561,402

[45] Date of Patent: Dec. 31, 1985

[54] METHOD AND SYSTEM FOR INTERNAL COMBUSTION ENGINE OXYGEN SENSOR HEATING CONTROL, SYNCHRONIZING HEATER VOLTAGE DETECTION WITH HEATER ENERGIZATION, AND CALCULATING POWER LOSS

[75] Inventors: Jiro Nakano; Takao Ishibashi; Takao Akatsuka; Mamoru Takata, all of Toyota, Japan

[73] Assignee: Toyota Jidosha Kabushiki Kaisha, Toyota, Japan

[21] Appl. No.: 670,066

[22] Filed: Nov. 9, 1984

[30] Foreign Application Priority Data

May 7, 1984 [JP] Japan .......................... 59-090682

[51] Int. Cl.[4] .................... F02D 5/00; G01N 27/26

[52] U.S. Cl. .............................. 123/489; 123/440; 123/494

[58] Field of Search .................... 123/489, 440, 494; 73/23; 204/195 S, 406

[56] References Cited

U.S. PATENT DOCUMENTS 4,140,085 2/1979 Rabus et al. .................... 123/440
4,214,563 7/1980 Hosaka .......................... 123/440
4,332,225 6/1982 Cox et al. ....................... 123/440
4,354,468 10/1982 Sone et al. .................... 123/440
4,365,604 12/1982 Sone ............................ 123/440
4,393,841 7/1983 Drows et al. ................... 123/489
4,440,621 4/1984 Kitahara et al. ................ 204/406
4,471,648 9/1984 Uchida et al. .................. 73/23
4,492,205 1/1985 Jundt et al. .................... 123/489

*Primary Examiner*—Raymond A. Nelli
*Attorney, Agent, or Firm*—Kenyon & Kenyon

[57] ABSTRACT

An internal combustion engine has an exhaust system and an oxygen sensor fitted to the exhaust system including a sensor element and an electrically powered heater for heating it. The power supplied to the heater is controlled by determining a target value for it according to operational parameters of the engine, and by controlling the mean power in a time interval as follows: the voltage applied to the heater and the current flowing through it are detected, an intermittent voltage is supplied to the heater, and the duty ratio of the intermittent voltage is controlled so that the product of the heater voltage and the heater current is substantially equal to the target power, with the detection of the voltage supplied to the heater synchronized with the energization of the heater. A system is also described for implementing this method.

4 Claims, 11 Drawing Figures

METHOD AND SYSTEM FOR INTERNAL COMBUSTION ENGINE OXYGEN SENSOR HEATING CONTROL, SYNCHRONIZING HEATER VOLTAGE DETECTION WITH HEATER ENERGIZATION, AND CALCULATING POWER LOSS

BACKGROUND OF THE INVENTION

The present invention relates to a method of controlling the heating of an oxygen sensor fitted to the exhaust system of an internal combustion engine for the purpose of controlling air-fuel mixture air/fuel ratio, and to a system for practicing the method. More particularly, the present invention relates to such a method and device for oxygen sensor heating control which synchronize the detection of an intermittent or pulse voltage applied to an electrical heater element of the oxygen sensor with the time interval in which said heater element is energized, thereby controlling more accurately the power to said heater element.

The present patent application has been at least partially prepared from material which has been included in Japanese Patent Application No. Sho 59-90682(1984), which was invented by the same inventors as the present patent application, and the present patent application hereby incorporates the text of that Japanese Patent Application and the claim or claims and the drawings thereof into this specification by reference; a copy is appended to this specification.

It is known to fit an oxygen sensor to the exhaust system of an internal combustion engine. Such an oxygen sensor typically comprises a solid electrolyte or semiconductor, and varies a generated current or resistance in response to the concentration of oxygen in the exhaust gases of the engine. This electrical signal is fed to a control device which controls the amount of fuel provided to the engine in relation to the amount of air sucked thereinto, and is used for controlling the air/fuel ratio of the air-fuel mixture supplied to the engine by a feedback process. Various such forms of control device, which practice various methods of air-fuel mixture ratio control, are per se known.

The output of the sensor element of such an oxygen sensor varies with temperature, and, particularly when the air/fuel ratio is lean and is in the range of 14.5 to 25, in order for the sensor element to accurately measure the oxygen concentration, said sensor element must be maintained at a temperature higher than a certain critical minimum active temperature. This maintenance of the temperature of the sensor element can be done by using a heater, and oxygen sensors with sensor element heaters have already been proposed, along with methods for operation of such heaters; for example in Japanese Patent Application No. 53-78476, which has been published as Japanese Patent Publication No. 54-13396. Further, in Japanese Patent Application No. 53-83120, which has been published as Japanese Patent Publication No. 54-21393, there has been proposed a method and a system for control of the eletrical power supplied to such an oxygen sensor element heater, in which the power is varied as a function of intake manifold pressure, of throttle opening, and of engine revolution speed, so as to ensure that the oxygen sensor element is kept at a temperature no lower than its minimum active temperature.

The sensor element of such an oxygen sensor fitted to an exhaust system is of course heated up by the exhaust gases in the exhaust system, so the effect of a heater for the sensor element must be controlled to take account of the temperature of these exhaust gases. Now, in an internal combustion engine which is controlled by a throttle valve, the exhaust temperature is largely determined by the amount of air-fuel mixture supplied per engine piston stroke and by engine revolution speed, and if the air/fuel ratio of the air-fuel mixture is constant the amount of such mixture supplied is proportional to the rate of intake air flow. Therefore, in the above mentioned patent applications, the above are used as parameters, and the supply of electricity to the sensor element heater is varied depending on the engine load and the engine revolution speed. Thus, the exhaust temperature is considered to depend on the engine intake flow and engine revolution speed, and the values are determined experimentally in advance with reasonable accuracy. This method and system are adequate to keep the temperature of the sensor element of the oxygen sensor reasonably constant regardless of engine operational conditions.

The heater element of such an oxygen sensor fitted to an exhaust system is typically of a pure resistive load type, using the Joule heating phenomenon for producing heating power, and typically such a heater element has a resistance which increases as its temperature increases. This causes fluctuations in the power dissipated in the heater element, with respect to the same voltage supplied thereto. One approach to tackling this problem is to supply a pulsed voltage signal to the heater element, and to alter the duty ratio of this pulsed voltage signal so as to keep the heater power, as measured by the product of the current through said heater element and the voltage across said heater element, at the desired control target value. In this case, however, the pulse nature of the voltage signal should be allowed for.

Further, ideally the actual voltage across the heater element should be measured, but in practice the supply voltage to the control unit therefor may be used. In this case, however, the internal resistance of the vehicle battery, and in the wiring harness of the vehicle and so on, may mean a fluctuation in voltage of some hundreds of millivolts or so, between the times when the heater is on and the times when it is off. This can be a source of error if it is not allowed for. Also, the saturation voltage across the emitter and the collector of a control transistor for the heater element is a non linear function of the collector current, and so to correct for it could possibly involve rather complicated calculation.

SUMMARY OF THE INVENTION

Accordingly, it is the primary object of the present invention to provide a method and system for internal combustion engine oxygen sensor heating control, which control the power supplied to the heater of the oxygen sensor more accurately.

It is a further object of the present invention to provide such a method and system for oxygen sensor heating control, which provide proper timing of the detection of the voltage across the heater element of the oxygen sensor.

It is a further object of the present invention to provide such a method and system for oxygen sensor heating control, which provide proper timing of the detection of the current through the heater element of the oxygen sensor.

It is a further object of the present invention to provide such a method and system for oxygen sensor heating control, which take account of the quick variation inherent in the pulse signal nature of the voltage signal supplied to the heater element of the oxygen sensor.

According to the most general method aspect of the present invention, these and other objects are accomplished by, for an internal combustion engine comprising an exhaust system and an oxygen sensor fitted to said exhaust system comprising a sensor element and an electrically powered heater for heating said sensor element: a method for controlling the electrical supply to said heater, wherein: according to operational parameters of said engine, a target value for the power to be supplied to said heater is determined; and the mean power in a time interval is controlled as follows: the voltage applied to said heater and the current flowing through said heater are detected, an intermittent voltage is supplied to the heater, and the duty ratio of said intermittent voltage supply is controlled in such a way that the product of the heater voltage and of the heater current is substantially equal to said target power to be supplied; and wherein the detection of the voltage applied to said heater is synchronized with the energization of said heater; and according to the most general device aspect of the present invention these and other objects are accomplished by, for an internal combustion engine comprising an exhaust system and an oxygen sensor fitted to said exhaust system comprising a sensor element and an electrically powered heater for heating said sensor element: a system for controlling the electrical supply to said heater, comprising: a means for determining a target value for the power to be supplied to said heater, according to operational parameters of said engine; and a means for controlling the mean power in a time interval by detecting the voltage applied to said heater and the current flowing through said heater, while synchronizing said detection of the voltage applied to said heater with the energization of said heater, by supplying an intermittent voltage to said heater, and by controlling the duty ratio of said intermittent voltage supply in such a way that the product of the heater voltage and of the heater current is substantially equal to said target power to be supplied.

According to such a method and such a system, because the detection of the voltage supplied to said heater is synchronized with the energization of said heater, the power supplied to the heater of the oxygen sensor is controlled more accurately, and proper timing of the detection of the voltage across the heater element of the oxygen sensor is provided. Thus, the quick variation inherent in the pulse signal nature of the voltage signal supplied to the heater element of the oxygen sensor is taken account of.

BRIEF DESCRIPTION OF THE DRAWINGS

The present invention will now be shown and described with reference to the preferred embodiment thereof, and with reference to the illustrative drawings. It should be clearly understood, however, that the description of the embodiment, and the drawings, are all of them given purely for the purposes of explanation and exemplification only, and are none of them intended to be limitative of the scope of the present invention in any way, since the scope of the present invention is to be defined solely by the legitimate and proper scope of the appended claims. In the drawings, like parts and features are denoted by like reference symbols in the various figures thereof, and:

DESCRIPTION OF THE PREFERRED EMBODIMENT

Figure 1:
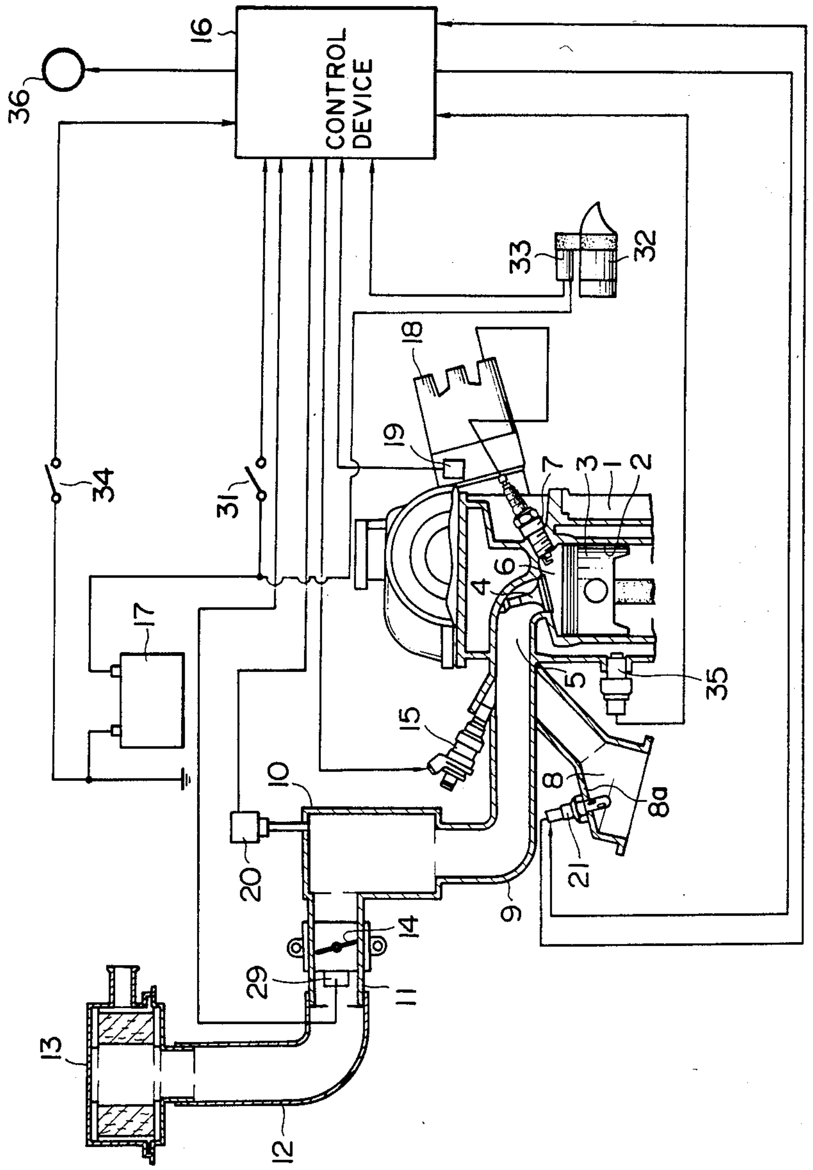
FIG. 1 is a partly schematic partly sectional view of an internal combustion engine which is equipped with the preferred embodiment of the oxygen sensor heating control system of the present invention, also showing various ancillary elements thereof.

FIG. 1 shows in schematic view an internal combustion engine with an oxygen sensor of the above described kind, said engine incorporating the preferred embodiment of the oxygen sensor heating control system of the present invention, for performing the preferred embodiment of the oxygen sensor heating control method of the present invention. In this figure, the internal combustion engine 1 has a cylinder bore 2 within which a piston 3 reciprocates, said piston 3 being coupled in a per se conventional manner to a crankshaft, not shown, by a connecting rod, only partially shown; in fact the engine 1 has a plurality of such cylinders and pistons but only one of each of them can be seen in the figure. A combustion chamber 6 is defined above the piston 3 in the figure in the cylinder bore 2, between it and a cylinder head, and an intake port 5 opens to this combustion chamber 6 via a valve aperture the opening and closing of which is controlled by an intake valve 4. A per se conventional spark plug 7 provides ignition for air-fuel mixture in the combustion chamber 6 when appropriately energized. Further, an exhaust port, not shown in the figure, opens to the combustion chamber 6 via a valve aperture the opening and closing of which is controlled by an exhaust valve, also not shown, and to this exhaust port there is connected an exhaust system, only a portion of an exhaust manifold 8 incorporated in which is shown.

To the inlet port 5 there is connected the downstream end of an intake manifold 9, the upstream end of which is connected to the outlet of a surge tank 10. To the inlet of the surge tank 10 there is connected the downstream end of a throttle body 11, the upstream end of which is connected to the downstream end of an inlet tube 12. The upstream end of this inlet tube 12 is communicated to the outlet of an air cleaner 13, the inlet of which is left open to the atmosphere. In the throttle body 11 there is mounted an intake butterfly valve 14 the opening and closing action of which for intake air amount control is linked to the foot depression movement of a throttle pedal for the engine 1, not shown, by a throttle pedal linkage also not shown.

To the intake manifold 9 there is mounted a per se conventional fuel injection valve 15 which incorporates a solenoid 15*a* (not shown in FIG. 1), and this fuel injection valve 15 is supplied with pressurized fuel (i.e. gasoline) by a fuel supply system which is not shown. The opening and closing action of this valve 15 is electronically controlled by a control device 16 which will be more particularly described hereinafter. Thus, the valve 15 squirts spirts of fuel into the intake manifold 9 the total volume of each of which depends on the opening and closing times thus provided for said fuel injection valve 15 by the control device 16.

The control device 16 is supplied with actuating electrical energy from the battery 17 of the vehicle to which this engine 1 is fitted, via an ignition switch 31. To the distributor 18 of the engine 1 there is fitted a crank angle sensor 19, the electrical output signal of which is representative of the position of the crankshaft of the engine 1 and is dispatched to the control device 16. To the surge tank 10 of the engine 1 there is fitted an intake pressure sensor 20, the electrical output signal of which is representative of the air pressure in the intake system of the engine 1 and is also dispatched to the control device 16. To the wall 8*a* of the exhaust manifold 8 of the engine 1 there is fitted an oxygen sensor 21 to be more particularly described later, the electrical output signal of which is representative of the oxygen concentration in the exhaust gases flowing through said exhaust manifold 8 and is also dispatched to the control device 16; and the oxygen sensor 21 further has a heater 28 (not shown in FIG. 1) as will be described later, supply of actuating electrical energy to which is provided from the control device 16. To the throttle valve 14 mounted in the intake system of the engine 1 there is fitted a throttle valve idling opening amount sensor 29 incorporating a switch 29*a* (not shown particularly in FIG. 1), the electrical output signal of which is also dispatched to the control device 16 and is representative of the opening amount of said throttle valve 14, being ON when said throttle valve 14 is opened by more than a predetermined amount and thus indicating engine operation at a level higher than idling level and being OFF when the throttle valve 14 is opened by less than said predetermined amount and thus indicating engine idling operation. To the starter 32 of the engine 1 there is fitted a starter switch 33, an electrical output signal from which is indicative of whether said starter 32 is being actuated to crank said engine 1 or not and is also dispatched to the control device 16. And to the water jacket of the engine 1 there is fitted a water temperature sensor 35, the electric output signal of which is indicative of the temperature of the cooling water of said engine 1 and is also dispatched to the control device 16. Further a test switch 34 optionally provides earthing for a terminal of the control device 16, and an output signal from said control device 16 is fed to a test alarm lamp 36.

Figure 2:
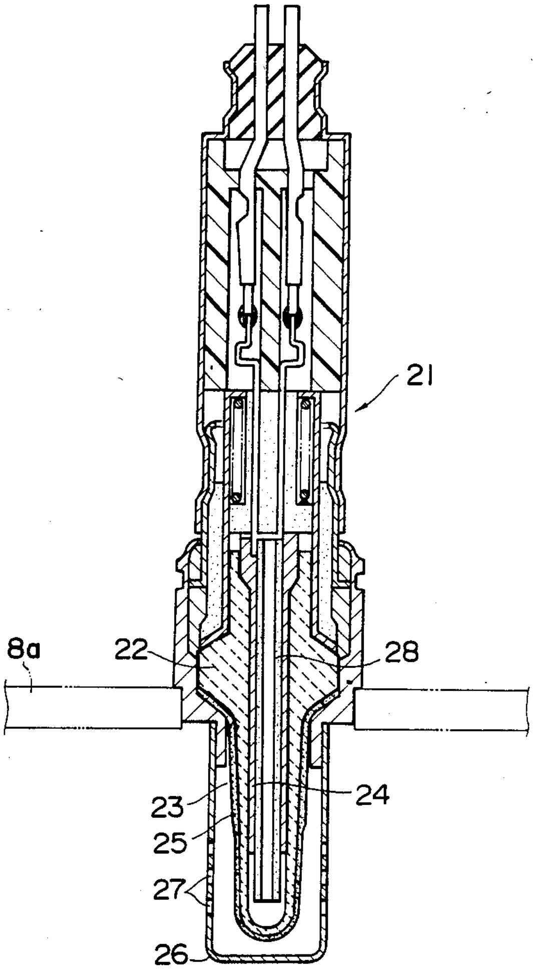
FIG. 2 is an enlarged longitudinal sectional view of an oxygen sensor fitted to the engine of FIG. 1 and shown in said figure.

Referring to FIG. 2, the oxygen sensor 21 fitted in the wall 8*a* of the exhaust manifold 8 comprises a sensor element 22 formed as a tube with one end closed and made of a solid electrolyte material such as zirconia which can transmit oxygen ions. The outside of this sensor element 22 has, laid on it, an outer electrode 23 formed as a porous thin conducting layer (this layer is not clearly separately shown in the figure because it is so thin as to be represented by a single line), and the inside of said sensor element 22 has, likewise laid on it, an inner electrode 24 likewise formed as a porous thin conducting layer (again, this layer is shown only by a single line in FIG. 2). The outer surface of the outer electrode 23 has an exhaust gas dispersion layer 25 also laid on it, said layer 25 being formed of porous ceramic. The sensor element 22, etc., are mounted within a casing and so on, not particularly described here because they are per se known, and are fixed into the wall 8*a* of the exhaust manifold 8 with their lower parts in FIG. 2 projecting into the interior of said exhaust manifold 8. And a shield 26 with a plurality of holes 27 formed therein is provided around said lower ends of the sensor element 22 etc. projecting into the exhaust manifold 8, so as to protect them from the impact of the rushing flow of exhaust gases in the exhaust manifold 8, while allowing said exhaust gases to impinge gently on the exhaust gas dispersion layer 25 and the outer electrode 23 to reach the sensor element 22. During use of this oxygen sensor 21 as a current limiting type lean sensor, a certain voltage is applied by the control device 16 between the outer electrode 23 and the inner electrode 24 as will be explained in detail hereinafter, so that as is per se well known the current between these electrodes increases approximately in proportion to the oxygen concentration in the exhaust gases flowing through the exhaust manifold 8, within certain limits. And, in order to keep the sensor element 22 etc. at the correct temperature for activation, an electrical heater 28 is provided for the oxygen sensor 21. This heater 28 is a per se known type of resistive heater, and the magnitude of the heating power instantaneously provided thereby is proportional to the product of the voltage and the amperage being provided by the control device 16 thereto.

The function of the control device 16 is in partial outline as follows. From the data it receives relating to engine rotational speed from the crank angle sensor 19 and relating to intake manifold pressure from the intake manifold pressure sensor 20, it determines the volume of intake air which is being sucked into the combustion chamber in each intake stroke of the piston 3, and according thereto determines a theoretically proper amount of fuel to be mixed with this intake air to provide a proper and appropriate target value for the air/fuel ratio of the air-fuel mixture in the combustion chamber. And, during normal engine operation, as determined by when the engine 1 has been warmed up as is indicated by the output of the engine cooling water temperature sensor 35 and possibly as also determined by other criteria, based upon the actual value of the oxygen concentration in the exhaust gases in exhaust manifold 8 of the engine 1 as detected by the oxygen sensor 21, information regarding which is dispatched therefrom to the control device 16, said control device 16 makes a correction to this theoretical value in order to produce a value for the actual amount of fuel to be injected, so as to bring the air/fuel ratio to its target value by a form of per se known feedback control. Then, the control device 16 produces electrical output signals at appropriate crank angles and supplies them to the solenoid 15*a* of the fuel injector 15, so as to control the opening and closing of the fuel injector 15 so as to inject this determined appropriate amount of fuel, in each injection spirt. On the other hand, when the engine 1 has not yet properly been warmed up as determined by the aforementioned criteria, no such feedback correction according to exhaust oxygen concentration of the calculated theoretically proper amount of fuel to be injected in order to provide a proper and appropriate target value for the air/fuel ratio of the air-fuel mixture in the combustion chamber is made, but instead the theoretically calculated value is directly used as a value of fuel to be injected, and accordingly the control of fuel injection is by a form of open loop control without any feedback. At this time the air/fuel ratio is controlled to be smaller than in the warmed up engine case when feedback is being utilized.

Figure 3:
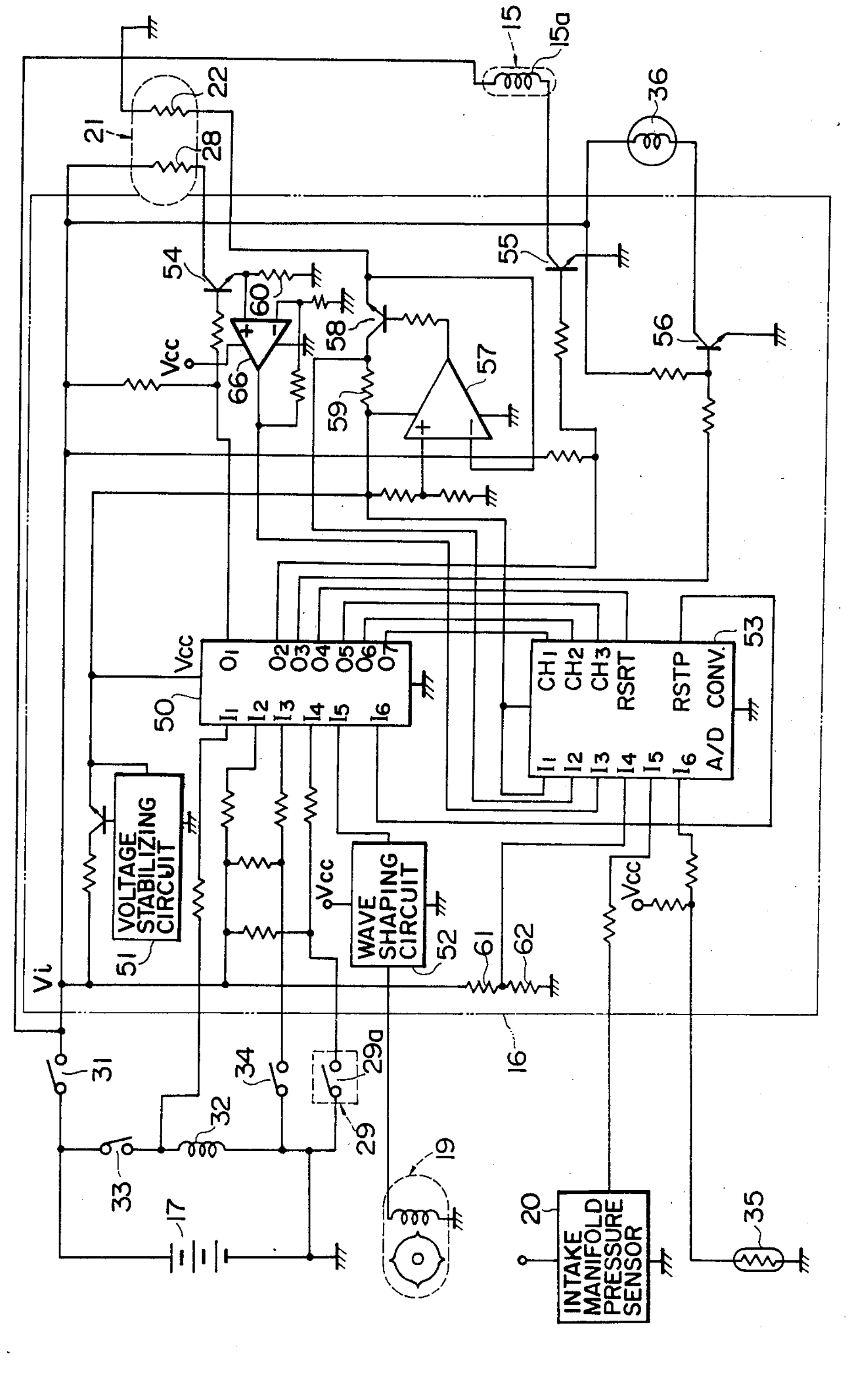
FIG. 3 is a partial circuit diagram of the preferred embodiment of the oxygen sensor heating control system of the present invention, and of various ancillary elements thereof, and particularly shows a microcomputer incorporated in said control system.

Referring to FIG. 3, herein the internal structure of the control device 16 is partially shown as an electrical circuit diagram, and also ancillary circuits relating thereto are shown. This control device 16 comprises a microcomputer 50, which may be for example of the Motorola 6801 type, and this microcomputer 50 is powered, like other parts of the circuitry of the control device 16, by a constant voltage Vcc supplied by a voltage regulator circuit 51 of a per se well known type, when and only when the ignition switch 31 of the vehicle is ON. This microcomputer 50 of this preferred embodiment has six inputs designated in the figure as I1 through I6 and seven outputs designated as O1 through O7. The inputs I1 through I6 are connected as follows. The input I1 receives an ON signal when and only when the starter switch 33 is in the ON state. The input I2 receives an ON signal when and only when the ignition switch 31 of the vehicle is in the ON state. The input I3 receives an ON signal when and only when the test switch 34 is in the OFF state. The input I4 receives an ON signal when and only when the switch 29*a* incorporated in the throttle valve idling opening amount sensor 29 is in the OFF state, i.e. when and only when the engine 1 is not idling. The input I5 receives the output of the crank angle sensor 19, after this has been converted to a square wave by a wave shaping circuit 52. And the input I6 receives a pulse width signal from a RSTP terminal of an A/D converter (an analog-digital converter) 53 of a per se well known sort. Further, the outputs O1 through O7 are connected as follows. The signal from the output O1 is furnished to the base of a transistor 54 as a pulse signal, so as to control the power supplied to the heater 28 of the oxygen sensor 21 as will be explained hereinafter. The signal from the output O2 is furnished to the base of a transistor 55 as a pulse signal, so as to control the solenoid 15*a* of the fuel injector 15 for providing fuel injection. The signal from the output O3 is furnished to the base of a transistor 56 as a sensor diagnostic result signal, so as to selectively energize the test alarm lamp 36 according to the result of circuit testing, as will be explained hereinafter. The signal from the output O4 is furnished to a convert control terminal RSRT of the A/D converter 53 as a convert start signal. And the signals from the outputs O5 through O7 are furnished as channel control signals to the channel control terminals CH1 through CH3 respectively of said A/D converter 53.

The transistor 54 receives the pulse signal from the output O1 of the microcomputer 50 at its base, and is thereby selectively switched ON so as to provide power via its collector to the heater 28 of the oxygen sensor 21, when and only when said pulse signal from said output O1 is ON. This power for the heater 28 is provided directly from the battery 17 via the ignition switch 31, i.e. not via the voltage regulation circuit 51, and of course also via the wiring harness of the vehicle, which inevitably has a certain electrical resistance. The transistor 55 receives the pulse signal from the output O2 of the microcomputer 50 at its base, and is thereby selectively switched ON so as to provide power via its collector to the solenoid coil 15*a* of the fuel injector 15, when and only when said pulse signal from said output O2 is ON. And the transistor 56 receives the signal from the output O3 of the microcomputer 50 at its base, and is thereby selectively switched ON so as to provide power via its collector to the test alarm lamp 36, when and only when said signal from said output O3 is ON. And the reference numeral 57 denotes a differential amplifier: when the ignition switch 31 is ON, then a constant voltage Vcc is provided via the voltage regulation circuit 51, and drives the transistor 58 to supply a constant voltage to the sensor element 22 of the oxygen sensor 21.

The A/D converter 53 comprises a multiplexer, not particularly shown, and is powered by the constant voltage Vcc supplied by the voltage regulator circuit 51. This A/D converter 53 of this preferred embodiment has six inputs designated as I1 through I6, as well as a control terminal RSRT and an output terminal RSTP and channels CH1 through CH3. The inputs I1 through I6 are connected as follows. The input I1 receives the reference voltage signal Vcc. The input I2 receives a voltage signal dropped from this reference voltage Vcc by a variable amount which depends upon the current through the sensor element 22 of the oxygen sensor 21 because of the resistor 59 as shown in the circuit diagram of FIG. 3. The input I3 receives a voltage signal amplified by a differential amplifier 66 from the voltage across a load dropping resistor 60, thus detecting the value of the current passing through the heater 28 of the oxygen sensor 21. The input I4 receives a voltage signal proportional to the current value of the voltage Vi being supplied by the battery 17, according to the operation of a voltage divider circuit incorporating two resistors 61 and 62. This voltage signal is of course not actually proportional to the voltage which is being applied across the heater 28, but as stated above rather is proportional to the voltage Vi being supplied to the control unit by the battery 17. The input I5 receives a voltage signal representative of the pressure in the surge tank 10 of the engine intake system from the intake pressure sensor 20. And the input I6 receives a voltage signal representative of the temperature of the cooling water of the engine 1 from the engine cooling water temperature sensor 35.

Thus during operation by using a combination of the CH1 through CH3 signals from the microcomputer 50 a particular one of the input signals I1 through I6 is selected, and then, when the "start A/D convert" signal is dispatched by the microcomputer 50 (from its output O4) and is received at the RSRT terminal of the A/D converter 53, said A/D converter 53 performs the analog-digital conversion process and outputs a pulse width signal corresponding to the voltage of the selected input from its output terminal RSTP to the input I6 of the microcomputer 50. In particular, the microcomputer 50 receives pulse width signals from the A/D converter 53 which are together representative of the voltage across the current detecting resistor 59 for the sensor element 22 of the oxygen sensor 21, said signals being received by said A/D converter 53 at its I1 and I2 input terminals; and, by converting these pulse width signals into digital values and by subtracting one of them from the other, the microcomputer 50 can obtain a digital value representative of said voltage across said sensor element 22. This value, which is representative of the oxygen concentration in the exhaust gases flowing through the exhaust manifold 8, is the value that the microcomputer 50 uses for performing the above described feedback control of the air/fuel ratio of the air-fuel mixture supplied to the engine 1, when appropriate.

Now, the opertion of this preferred embodiment of the oxygen sensor heating control system of the present invention, while performing the preferred embodiment of the oxygen sensor heating control method of the present invention, will be explained with reference to FIGS. 4, 5, and 6, which are flow charts of the operation of certain parts of the program stored in the microcomputer 50.

Figure 4:
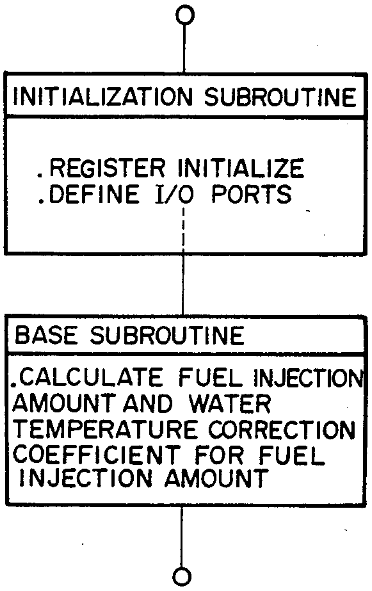
FIG. 4 is a flow chart of an initialization and base subroutine stored in the memory of the microcomputer of FIG. 3 and executed by it during the practice of the preferred embodiment of the oxygen sensor heating control method of the present invention.

The flow chart of FIG. 4 shows the opertion of an initialization and base subroutine which is caused to be executed by the microcomputer 50 when the ignition switch 31 is turned on. The initialization part of this subroutine performs various operations such as register initialization and I/O port definition and so on, while the base part of this subroutine performs various operations such as calculating the fuel injection amount for feedback and the fuel injection amount cooling water temperature correction coefficient and so on.

Figure 5:
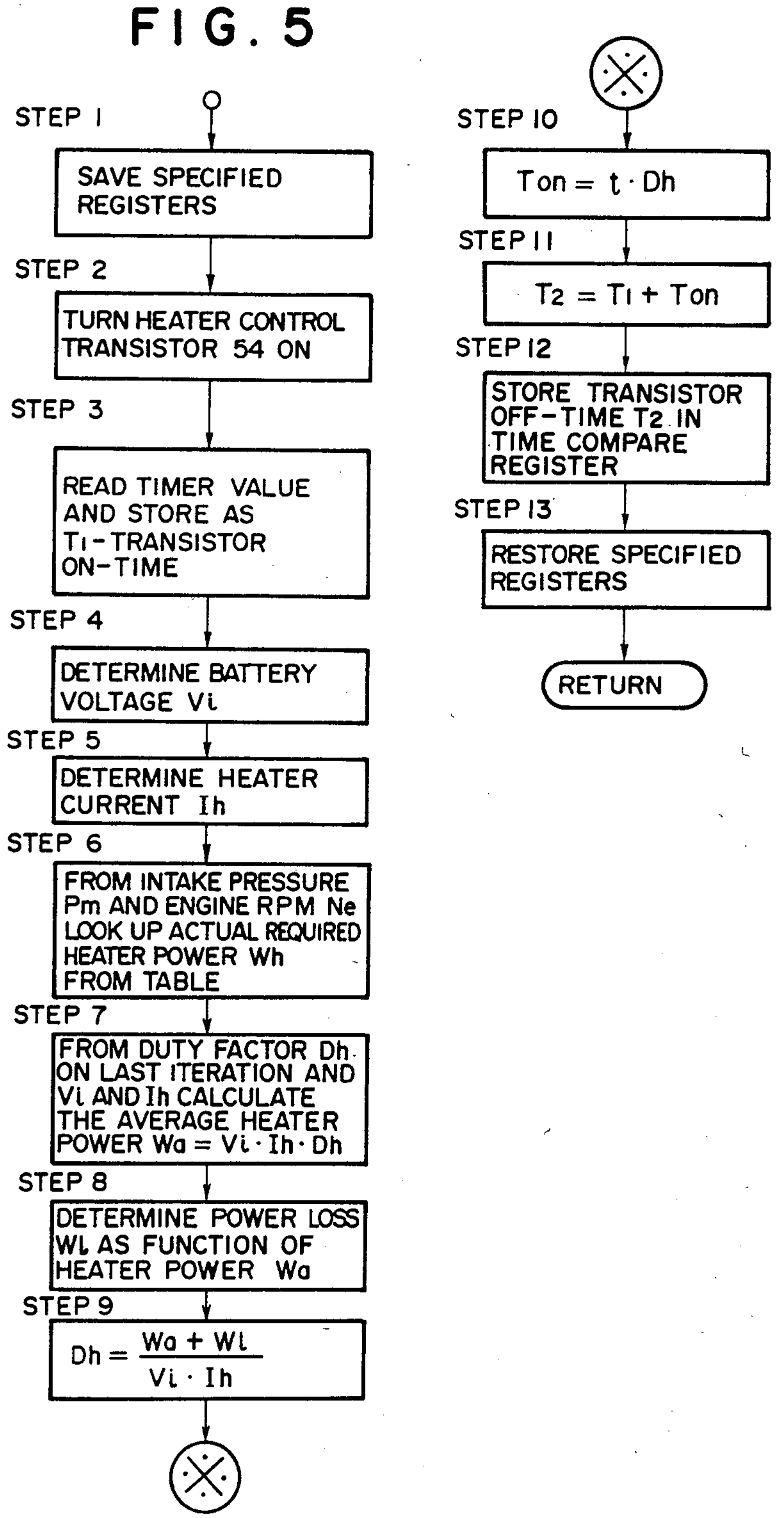
FIG. 5 is a flow chart of an interrupt subroutine for controlling supply of electrical energy to an oxygen sensor heater, stored in the memory of the microcomputer of FIG. 3 and executed by it at fixed intervals during the practice of said preferred method embodiment.

The flow chart of FIG. 5 shows the opertion of an interrupt subroutine for controlling supply of electrical energy to the heater 28 of the oxygen sensor 21; and this subroutine is caused to be executed by the microcomputer 50 at fixed intervals, which are for example of the order of tens of milliseconds.

In this FIG. 5 subroutine, first, in the step 1, certain registers are saved.

Next, in the step 2, the heater control transistor 54 is turned ON, i.e. an ON signal is output to the base of the transistor 54 from the output O1 of the microcomputer 50. This starts to supply power to the heater 28, i.e. turns said heater 28 ON.

Next, in the step 3, the present count value of a free running timer attached to the microcomputer 50 is read, and is stored as T1, the ON time for the transistor 54.

Next, in the step 4, the value Vi of the battery voltage is determined by, as described above, selecting the input I4 of the A/D converter 53 (see FIG. 3), which receives a voltage representative of this battery voltage Vi. In this case, the A/D converter 53 sends an output pulse signal representative of the battery voltage Vi to the microcomputer 50. It should be particularly noted that this detection of battery voltage Vi is done in synchronization with the power supply to the heater 28 having started, said starting of power supply having been performed in the step 2 of this subroutine.

In the next step 5, the value Ih of the current through the sensor element heater 28 is determined, likewise to the step 4 by selecting the input I3 of the A/D converter 53, and by thus reading into the microcomputer 50 a pulse signal corresponding to the voltage drop across the resistor 60 on said input I3 of the A/D converter 53. Again, it should be particularly noted that this detection of battery voltage Vi is done in synchronization with the power supply to the heater 28 having started, said starting of power supply having been performed in the step 2 of this subroutine.

Next, in the step 6, first the current values of the intake manifold pressure Pm and the engine revolution speed Ne are determined by the microcomputer 50: the intake manifold pressure Pm is determined in a similar way to the determination of the battery voltage Vi and of the heater current Ih in the steps 4 and 5 by the microcomputer 50 selecting the input I5 of the A/D converter 53, and the engine revolution speed Ne is determined by calculating the time interval between successive pulses from the crank angle position sensor 19 supplied to the input terminal I5 of the microcomputer 50. Next, by consultation of a two way look up table of values stored in the ROM (read only memory) of the microcomputer 50, a proper and appropriate value for the amount Wh of electrical power to be supplied to the heater 28 of the oxygen sensor 21 is determined. The values of Wh in this look up table in the ROM are determined in advance by experiment, and generally decrease as the intake pressure increases and as the engine revolution speed increases. It should be noted that this required or target power value Wh is the actual amount of power to be dissipated in the element of the heater 28, and excludes any power loss in the wiring harness, etc.

Next, in the step 7, the current average actual power consumption or dissipation Wa in the heater 28 is calculated, according to the equation Wa=Vi*Ih*Dh, where Vi and Ih are the actual current heater voltage and amperage as just calculated as above, and Dh is the current duty factor of the pulse electrical signal which is being supplied to the heater 28, said duty factor Dh having been calculated in the step 11 of the last iteration of this FIG. 5 subroutine some tens of milliseconds ago, and having been stored.

Figure 7:
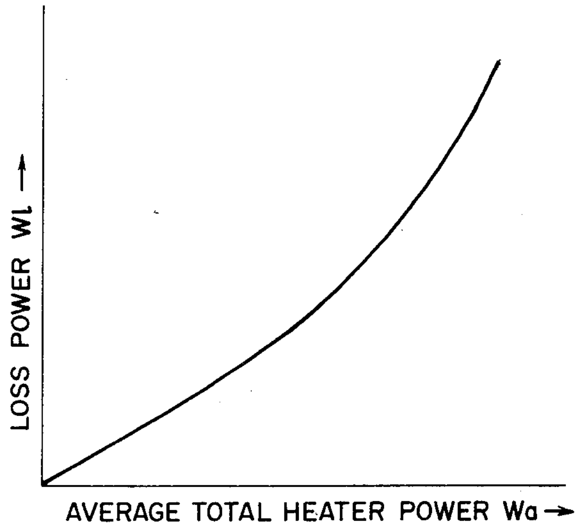
FIG. 7 is a graph showing on the vertical axis the power Wl which is being lost from the system in the wiring harness and so on and showing on the horizontal axis the average power Wa being supplied to the oxygen sensor heater.

Next, in the step 8, a value W1 for the power loss in the wiring harness and so on is determined, as being some function of the current average power consumption Wa, just determined in the step 7. The relationship between the power loss W1 and the average power Wa dissipated in the heater 28 may be investigated beforehand, in order to determine this function. In some cases, the relationship between W1 and Wa may be stored in the ROM memory of the microcomputer 50 in the form of a table, as schematically illustrated in FIG. 7 of the drawings, in which the power loss W1 is shown on the vertical axis and the total power Wa supplied is shown on the horizontal axis. In such a case, in this step 8, the value W1 is looked up from this table according to the current value of Wa. In other cases, in which the relationship between the power loss W1 and the heater power Wa is not so complicated, their relationship may be expressed in the program of FIG. 5 (when it is considered in more detail) as a formula for calculation, and in such a case in this step 8 the calculation of this formula is performed for obtaining the value W1 based upon the current value of Wa.

Next, in the step 9, the duty ratio Dh of the power pulse signal to be supplied to the heater element 28 of the oxygen sensor 21, in order to obtain the correct desired (average) power supply value Wa for the power actually dissipated in said heater 28, is calculated as the ratio of the sum of the desired power Wa and the power W1 that will be lost, to the power which would be dissipated in the heater element 28 if a continuous supply of power from the battery 17 were provided on the same basis as the instantaneous present one thereto—i.e. the product of the battery voltage Vi and the present heater current Ih. I.e., the equation used is $Dh=(Wa+W1)/(Vi*Ih)$. This duty ratio Dh thus decreases with increase in Ih, the current in the heater 28. It will be understood that this calculation is not absolutely accurate, since the value of the lost power W1 that is used therein is that produced by using the value of Dh that pertained to the last iteration of this FIG. 5 subroutine and not the value of Dh just calculated; but this will give no problem, since the value of Dh alters fairly slowly, and the value of W1 in any case only affects the value calculated for Dh with a fairly low gearing or sensitivity, and thus by a homing in process, as the FIG. 5 subroutine is executed many times per second, the substantially correct result will be attained.

Next, in the step 10, from the heater control period t and the duty ratio Dh calculated as above, the length of time Ton that the heater 28 is to be energized is calculated as t.Dh. And next, in the step 11, the time point T2 at which the heater 28 should be deenergized is determined, as being T1+Ton.

Next, in the step 12, this time T2, at which the transistor 54 should be turned OFF and the heater 28 should be deenergized, is stored in a "time compare register".

Finally, in the step 13, the registers which were saved in the step 1 are restored; and then the subroutine returns.

Figure 6:
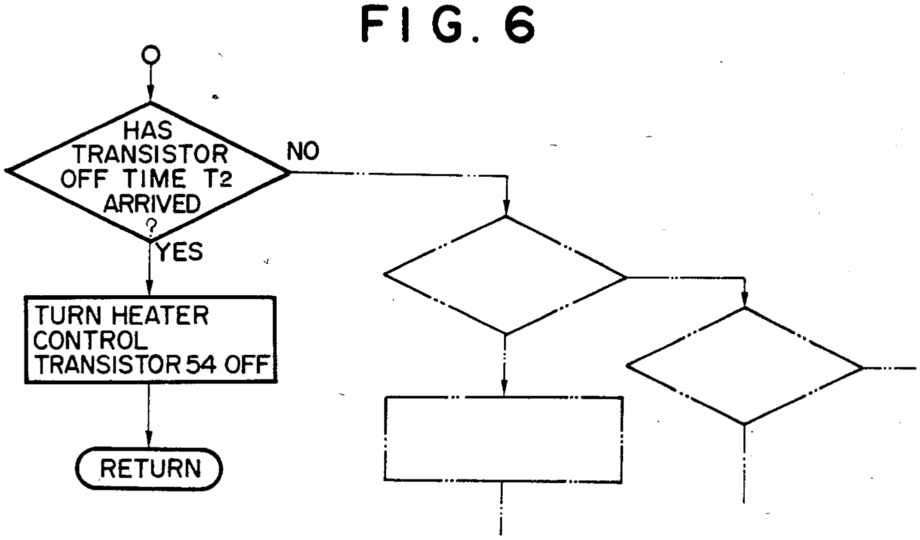
FIG. 6 is a flow chart of a time compare interrupt subroutine also stored in the memory of the microcomputer of FIG. 3 during the practice of said preferred method embodiment.

The flow chart of FIG. 6 partially shows the operation of a time compare interrupt subroutine. In this subroutine, first a decision is made as to whether the transistor off time T2, stored in the time compare register as explained in the step 13, has arrived or not. It should be understood that the time counter is upcounted at fixed time intervals. If the time point T2 has not yet arrived, then the flow of control is transferred to various other interrupt decisions and actions, as schematically indicated by the double dotted lines and boxes; but, if the time point T2 for switching the heater power supply transistor 54 has in fact arrived, then the flow of control is transferred to a block which turns said heater control transistor 54 OFF by outputting to its base an OFF signal from the output O1 of the microcomputer 50. This stops supplying power to the heater 28, i.e. turns said heater 28 OFF. And then finally the subroutine returns.

Figure 8:
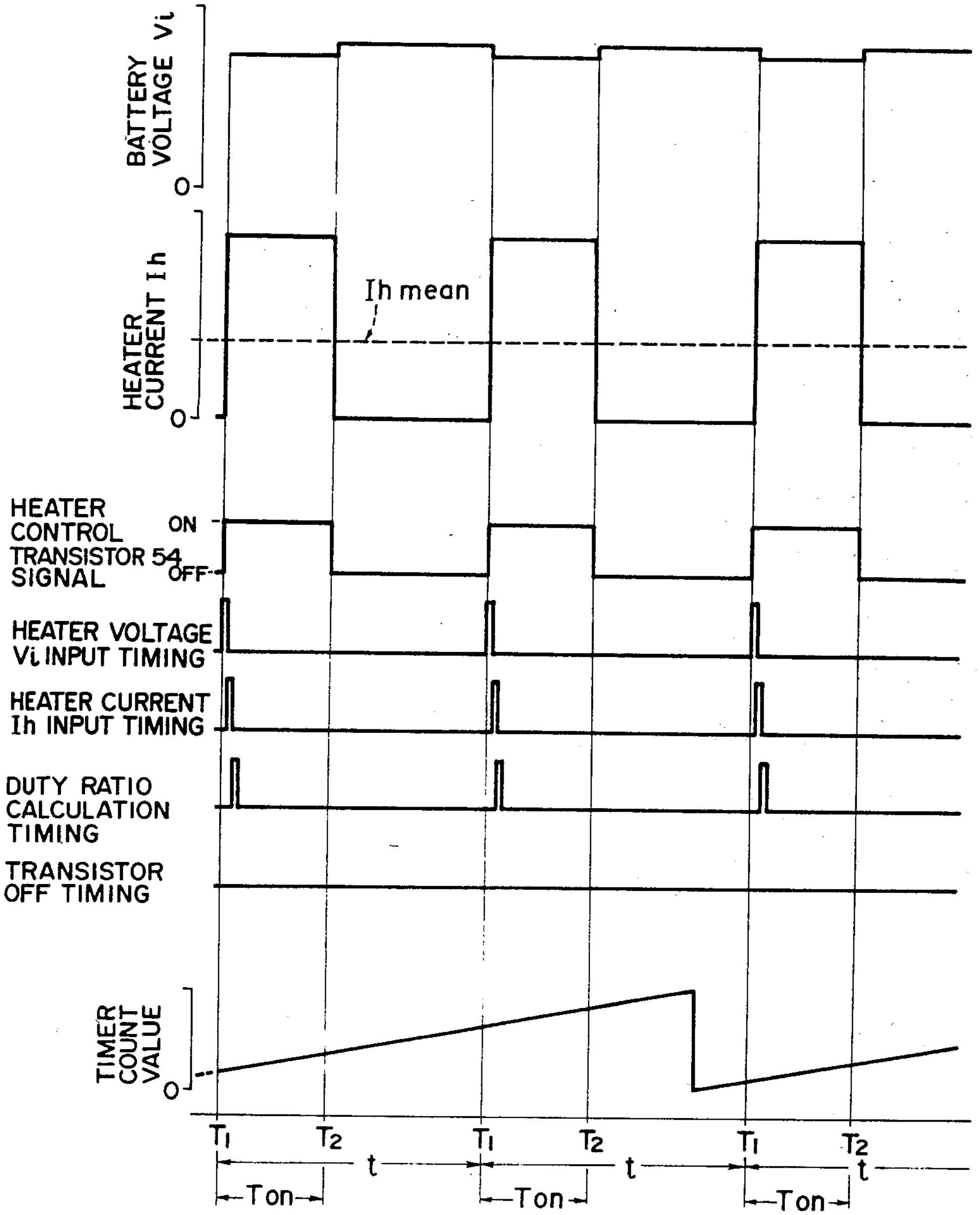
FIG. 8 is a time chart showing, against time, the voltage Vi being delivered by the battery of the vehicle incorporating this system, the current Ih being supplied to the heater for the oxygen sensor element, the ON/OFF signal to a heater control transistor, a voltage input timing, a heater current input timing, the timing of a calculation of duty ratio, the timing of a transistor-OFF signal, and the value of a count counted by a timer, in the preferred embodiment of the present invention.

Thus, referring to FIG. 8, which is a timing chart showing the duty ratio control performed by the interrupt routine, and which shows against time the battery voltage Vi, the current Ih received by the heater 28, the ON/OFF signal to the heater control transistor 54, the Vi input timing, the Ih input timing, the timing of the calculation of duty ratio, the timing of the transistor-OFF signal, and the count value counted by the timer, the operation of the shown preferred embodiment of the present invention will be further clarified.

Now, some mathematical and calculation considerations with regard to the process explained above will be made. These considerations are helpful but not essential for understanding of the concept of the present invention.

Figure 9:
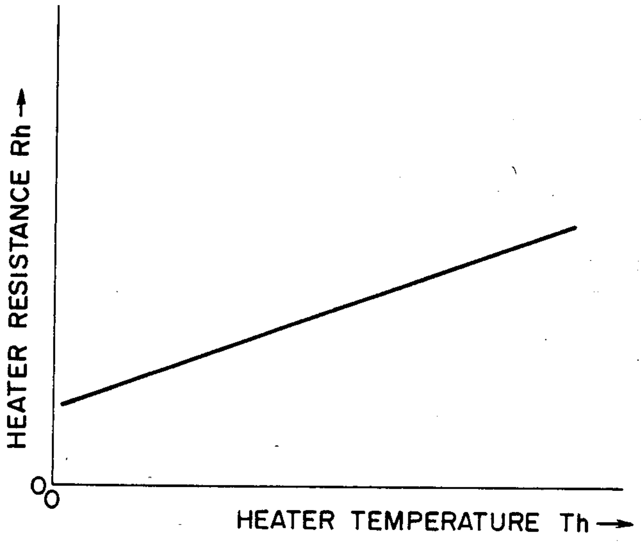
FIG. 9 is a graph showing the resistance Rh of the heater element of the oxygen sensor on the vertical axis and the temperature Th of said heater element on the horizontal axis.
Figure 10:
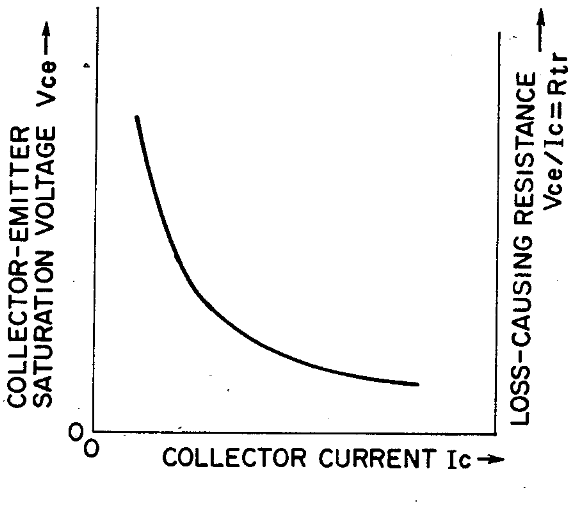
FIG. 10 is a graph showing the saturation voltage Vce from collector to emitter of a heater control transistor on the vertical axis and the collector current Ic for said transistor on the horizontal axis.

First, let Ra be the total resistance of the circuit which includes the oxygen sensor heater 28, let Rh be the resistance of the heater element itself, let Rw be the resistance of the wiring harness, and let Rtr be the resistance of the transistor 54; then $Ra=Rh+Rw+Rtr$. Now, Rh is a function, say f', of the oxygen sensor heater temperature Th and the current through said heater; so $Rh=f'(Th,Ih)$. A typical characteristic for the variation of the heater resistance with its temperature is as shown in FIG. 9, in which the heater temperature Th is shown along the horizontal axis and the heater resistance Rh is shown along the vertical axis. Also, the wiring harness resistance Rw is small and substantially constant. Further, the resistance Rtr of the transistor 54 is approximately equal to Vce/Ih, where Vce is the saturation voltage from collector to emitter of the transistor 54. FIG. 10 shows a typical characteristic for the variation of the saturation voltage from collector to emitter of the transistor 54, in said figure said saturation voltage Vce of said transistor 54 being shown on the vertical axis and the collector current Ic of said transistor 54 being shown on the horizontal axis.

Thus, from the overall power $Wa=Ra*Ih^2=(Rh+Rw+Rtr)*Ih^2$, we get $Vi*Ih=Rh*Ih^2+Rw*Ih^2+Vce*Ih^2$ $$Rh*Ih^2=(Vi-Vce)*Ih-Rw*Ih^2$$

$$=((Vi-Vce)-Rw*Ih)*Ih$$

$$Vi*Ih=((Vi-Vce)-Rw*Ih)*Ih$$

$$Vi=(Vi-Vce)-Rw*Ih$$

The control target power Wa in the case when the total power supplied to the heater element is to be controlled by duty ratio control is $$Wa=Vi*Ih*D=((Vi-Vce)*Ih-Rw*Ih^2)*D$$

$$\text{so } Wa+(Vce*Ih+Rw*Ih^2)*D=Vi*Ih*D$$

The duty ratio D for heater power control in this case is expressed by the following equation:

$$D=(Wa+(Vce*Ih+Rw*Ih^2)*D)/Vi*Ih$$

$$\text{Power loss } Wl=(Vce*Ih+Rw*Ih^2)*D=f(Vce*Ih*D)$$

$$\text{therefore } D=(Wa+Wl)/Vi*Ih=(Wa+f(Vce,Ih,D))/Vi*Ih$$

Figure 11:
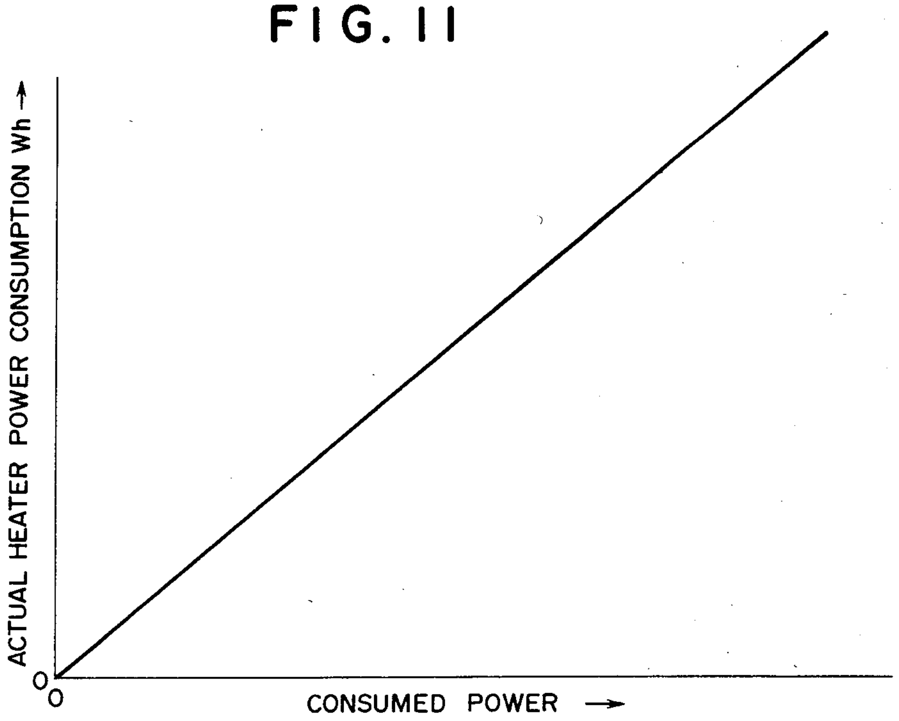
FIG. 11 is a graph showing the actual electric power consumption Wh on the vertical axis and the total electric power consumed on the horizontal axis.

The result of experimentally obtained actual heater power consumption Wa relative to the total power consumption is shown in FIG. 11, which is a graph in which said actual heater power consumption Wh is shown on the vertical axis and total consumed power is shown on the horizontal axis.

$$\text{The lost power } Wl=Wa-Wh=f(Wa)=f(Vi*Ih*Dh)$$

Next, put $Wa=Wh-Wl=Wh$, and we get $Pa=Vi*Ih*Dh-f(Vi,Ih,Dh)$;

and then $Dh=(Wa+Wl)/Vi*Ih=(Wa=f(Vi,Ih,Wh)/Vi*Ih$

Here, because the Dh term appears on both sides, the previously computed value of Dh may be used on the right hand side, and we may take the equation as approximately valid.

Therefore the power loss Wl=f(Wa'), where Wa' is the product of Vi and Ih (for this iteration of the FIG. 5 subroutine) and Dh (for the last iteration of the FIG. 5 subroutine).

Thus, by getting Wl as a function of Wa, it merely has to be added to Wa to determine the heater supply power. This can thus be done relatively simply, without any involved calculation of Wl.

It should be noted that, in this duty ratio control, the cycle period is typically of the order of some tens of milliseconds, and so an analog/digital converter or A/D converter such as a serial/sequential comparator, which can perform an A/D conversion in microseconds or tens of microseconds, with a high speed multiplexer, may be used. If on the other hand an A/D converter requiring some milliseconds for A/D conversion is used, then by synchronizing the multiplexer channel specification to the heater cycle, the timing for reading the voltge applied across the oxygen sensor heater can always be matched with energization of said heater.

Thus, according to the method and system of the present invention, because the detection of the voltage supplied to the heater 28 is synchronized with the energization of said heater 28, the power supplied to the heater 28 is controlled more accurately, and proper timing of the detection of the voltage across this heater 28 is provided. Thus, the quick variation inherent in the pulse signal nature of the voltage signal supplied to the heater element 28 is taken account of. Also, the power supplied to the heater 28 is controlled more accurately, in a simple and economical way without the performance of complicated calculations and without the provision of a complicated circuit. Thus, allowance is made for the losses due to the internal resistance of the battery 17 and in the wiring harness of the vehicle and so on. The allowance for these losses is practicable, even if they are not proportional or simply related to heater power. And these losses may be determined experimentally beforehand, so that the necessary corrections may be made by look up in a simple manner by the use of a simple and economical device.

Although the present invention has been shown and described with reference to the preferred embodiment thereof, and in terms of the illustrative drawings, it should not be considered as limited thereby. Various possible modifications, omissions, and alterations could be conceived of by one skilled in the art to the form and the content of any particular embodiment, without departing from the scope of the present invention. For example, although in the shown preferred embodiment the parameters according to which the fuel injection amount for the engine, and the amount of heater power provided for the oxygen sensor element heater, were engine intake manifold pressure and engine revolution speed, the present invention is not limited to this choice of parameters, and for example engine intake air flow and engine revolution speed could be utilized instead; other variations, such as throttle opening, are also possible for the chosen parameters. Therefore it is desired that the scope of the present invention, and of the protection sought to be granted by Letters Patent, should be defined not by any of the perhaps purely fortuitous details of the shown preferred embodiment, or of the drawings, but solely by the scope of the appended claims, which follow.

What is claimed is:

1. For an internal combustion engine comprising an exhaust system and an oxygen sensor fitted to said exhaust system comprising a sensor element and an electrically powered heater for heating said sensor element:

a method for controlling the electrical supply to said heater, wherein:

according to operational parameters of said engine, a target value for the power to be supplied to said heater is determined;

and the mean power in a time interval is controlled as follows: the voltage applied to said heater and the current flowing through said heater are detected, an intermittent voltage is supplied to the heater, and the duty ratio of said intermittent voltage supply is controlled in such a way that the product of the heater voltage and of the heater current is substantially equal to said target power to be supplied;

and wherein the detection of the voltage applied to said heater is synchronized with the energization of said heater.

2. A method for controlling heater electrical supply according to claim 1, wherein the detection of the current flowing through said heater is synchronized with the detection of the voltage applied to said heater.

3. A method for controlling heater electrical supply according to claim 1, wherein the timing of the operation of a multiplexer for reading the voltage applied across said heater is synchronized to the heater cycle.

4. For an internal combustion engine comprising an exhaust system and an oxygen sensor fitted to said exhaust system comprising a sensor element and an electriclly powered heater for heating said sensor element: a system for controlling the electrical supply to said heater, comprising: a means for determining a target value for the power to be supplied to said heater, according to operational parameters of said engine; and a means for controlling the mean power in a time interval by detecting the voltage applied to said heater and the current flowing through said heter, while synchronizing said detection of the voltage applied to said heater with the energization of said heater, by supplying an intermittent voltage to said heater, and by controlling the duty ratio of said intermittent voltage supply in such a way that the product of the heater voltage and of the heater current is substantially equal to said target power to be supplied.

* * * * *

UNITED STATES PATENT AND TRADEMARK OFFICE

CERTIFICATE OF CORRECTION

PATENT NO. : 4,561,402

DATED : December 31, 1985

INVENTOR(S) : J. Nakano, et al.

It is certified that error appears in the above-identified patent and that said Letters Patent is hereby corrected as shown below:

Column 6, line 18, after "Further" insert a comma.

Column 9, lines 37, 45 and 55, change "opertion" to --operation-- in each line.

Column 12, line 67, change"Ih=(Wa=f-" to --Ih=(Wa+f---.

Column 14, line 51, change "heter" to --heater--.

Signed and Sealed this

*Seventeenth* Day of *June 1986*

[SEAL]

*Attest:*

DONALD J. QUIGG

*Attesting Officer* *Commissioner of Patents and Trademarks*